United States Patent [19]
Birsching

[11] Patent Number: 5,842,536
[45] Date of Patent: Dec. 1, 1998

[54] POWER STEERING GEAR FOR MOTOR VEHICLE

[75] Inventor: Joel Edward Birsching, Unionville, Mich.

[73] Assignee: General Motors Corporation, Detroit, Mich.

[21] Appl. No.: 867,641

[22] Filed: Jun. 2, 1997

[51] Int. Cl.$^6$ ........................................................ B62D 5/00
[52] U.S. Cl. ........................ 180/417; 180/426; 180/427; 180/441
[58] Field of Search ............................ 180/441, 417, 180/426, 427

[56] References Cited

U.S. PATENT DOCUMENTS

| | | | |
|---|---|---|---|
| 3,406,773 | 10/1968 | Luther | 180/79.2 |
| 3,998,131 | 12/1976 | Adams | 91/372 |
| 4,034,825 | 7/1977 | Adams | 180/143 |
| 4,454,801 | 6/1984 | Spann | 91/375 A |
| 4,790,401 | 12/1988 | Sonoda | 180/142 |
| 4,819,545 | 4/1989 | Dymond | 91/371 |
| 5,119,898 | 6/1992 | Eckhardt et al. | 180/142 |
| 5,230,273 | 7/1993 | Fraley, Jr. | 91/371 |
| 5,272,933 | 12/1993 | Collier et al. | 74/498 |
| 5,291,963 | 3/1994 | Sangret | 180/141 |
| 5,492,191 | 2/1996 | Birsching | 180/79.1 |

*Primary Examiner*—Anne Marie Boehler
*Assistant Examiner*—Michael Cuff
*Attorney, Agent, or Firm*—Saul Schwartz

[57] ABSTRACT

A power steering gear for a motor vehicle including a pinion head and a spool shaft rotatable relative to each other, a torsion bar between the spool shaft and the pinion head, a valve spool formed integrally on the spool shaft, a valve body closely received on the spool shaft around the valve spool and rotatable relative to the spool shaft, and a tripod joint coupling the valve body to the pinion head for unitary rotation and consisting of three equally angularly spaced slots in an end of the valve body and three equally angularly spaced radial pins on the pinion head each having a spherical lobe closely received in a corresponding one of the slots in the valve body. An inboard end of the spool shaft adjacent the pinion head is unsupported laterally on the pinion head except through the valve body and the tripod joint and, consequently, floats with the valve body in the event of lateral runout between the pinion head and the spool shaft to minimize valve hysteresis attributable to such lateral runout. In a preferred embodiment, an electromagnetic apparatus of the power steering gear varies the effective restoring force of the torsion bar.

3 Claims, 3 Drawing Sheets

POWER STEERING GEAR FOR MOTOR VEHICLE

TECHNICAL FIELD

This invention relates to a power steering gear for a motor vehicle.

BACKGROUND OF THE INVENTION

In a motor vehicle power steering gear described in U.S. Pat. No. 4,454,801, issued 19 Jun. 1984 and assigned to the assignee of this invention, manual effort applied to an input or spool shaft of the gear is reacted to an output element or pinion head of the steering gear through a torsion bar which twists through an angle proportional to the applied effort. A control valve of the steering gear has a valve spool rotatable with the spool shaft and a valve body around the valve spool rotatable with the pinion head. Throttling orifices defined between the valve body and the valve spool open and close to regulate a steering assist boost pressure in accordance with the relative angular positions of the valve body and the valve spool corresponding to the angle through which applied manual effort twists the torsion bar. The valve body fits very closely around the valve spool to minimize fluid leakage therebetween. To minimize valve hysteresis attributable to rubbing or binding of the valve body against the valve spool due to lateral runout or eccentricity of the spool shaft relative to the pinion head, the valve body is coupled to the pinion head through a connection which permits the valve body to float with the spool shaft and which consists of a spherical lobe on a radial pin on the pinion head received in a cylindrical socket in the valve body.

U.S. Pat. No. 5,119,898, issued 9 Jun. 1992 and assigned to the assignee of this invention, describes a variable effort power steering gear having a control valve substantially as described in the aforesaid U.S. Pat. No. 4,454,801 and an electromagnetic apparatus for varying the effective restoring force of the torsion bar. The electromagnetic apparatus includes a magnet ring connected to the spool shaft, a pole piece connected to the valve body at the opposite end thereof from the pinion head, and an exciting coil for inducing electromagnetic torque between the magnet ring and the pole piece. A second radial pin on the pinion head diametrically opposite the radial pin in the valve described in the aforesaid U.S. Pat. No. 4,454,801 is closely received in a slot in the valve body to minimize binding between the valve body and valve spool attributable to reaction of electromagnetic torque through the valve body. More precise manufacturing of the power steering gear, however, is required in order to minimize valve hysteresis attributable to lateral runout between the pinion head and the spool shaft because the second radial pin prevents the valve body from floating with the spool shaft in directions otherwise permitted by the single radial pin in the valve described in the aforesaid U.S. Pat. No. 4,454,801.

U.S. Pat. No. 5,492,191, issued Feb. 20, 1996 and assigned to the assignee of this invention, describes a variable effort power steering gear in which improved performance relative to the variable effort power steering gear described in the aforesaid U.S. Pat. No. 5,119,898 is achieved by interposing an oval-shaped bushing between a spool shaft and the pinion head. The oval-shaped bushing minimizes binding between the valve body and the valve spool by permitting the spool shaft to float relative to the pinion head in the direction of the major axis of the oval-shaped bushing which direction is otherwise foreclosed by the aforesaid two radial pins of the variable effort steering gear described in the aforesaid U.S. Pat. No. 5,119,898.

U.S. patent application Ser. No. 08/497,570, filed 30 Jun. 1995 and assigned to the assignee of this invention, describes a variable effort power steering gear in which improved performance relative to the variable effort power steering gear described in the aforesaid U.S. Pat. No. 5,119,898 is achieved by interposing a universal joint between the valve body and the pinion head which permits the valve body to float relative to the pinion head in directions which are otherwise foreclosed by the aforesaid two radial pins of the variable effort steering gear described in the aforesaid U.S. Pat. No. 5,119,898.

SUMMARY OF THE INVENTION

This invention is a new and improved power steering gear for a motor vehicle including a pinion head and a spool shaft rotatable relative to each other, a torsion bar between the spool shaft and the pinion head, a valve spool formed integrally on the spool shaft, a valve body closely received on the spool shaft around the valve spool and rotatable relative to the spool shaft, and a tripod joint coupling the valve body to the pinion head for unitary rotation therewith and consisting of a plurality of three equally angularly spaced slots in an end of the valve body and a plurality of three equally angularly spaced radial pins on the pinion head each having a spherical lobe closely received in a corresponding one of the slots in the valve body. An inboard end of the spool shaft adjacent the pinion head is unsupported laterally on the pinion head except through the valve body and the tripod joint between the valve body and the pinion head and, consequently, floats with the valve body in the event of lateral runout between the pinion head and the spool shaft to minimize valve hysteresis attributable to such lateral runout. In a preferred embodiment, an electromagnetic apparatus of the power steering gear varies the effective restoring force of the torsion bar and includes a magnet ring connected to the spool shaft, a pole piece connected to the valve body at the opposite end thereof from the pinion head, and an exciting coil for inducing electromagnetic torque between the magnet ring and the pole piece.

DESCRIPTION OF THE PREFERRED EMBODIMENT

Figure 1:
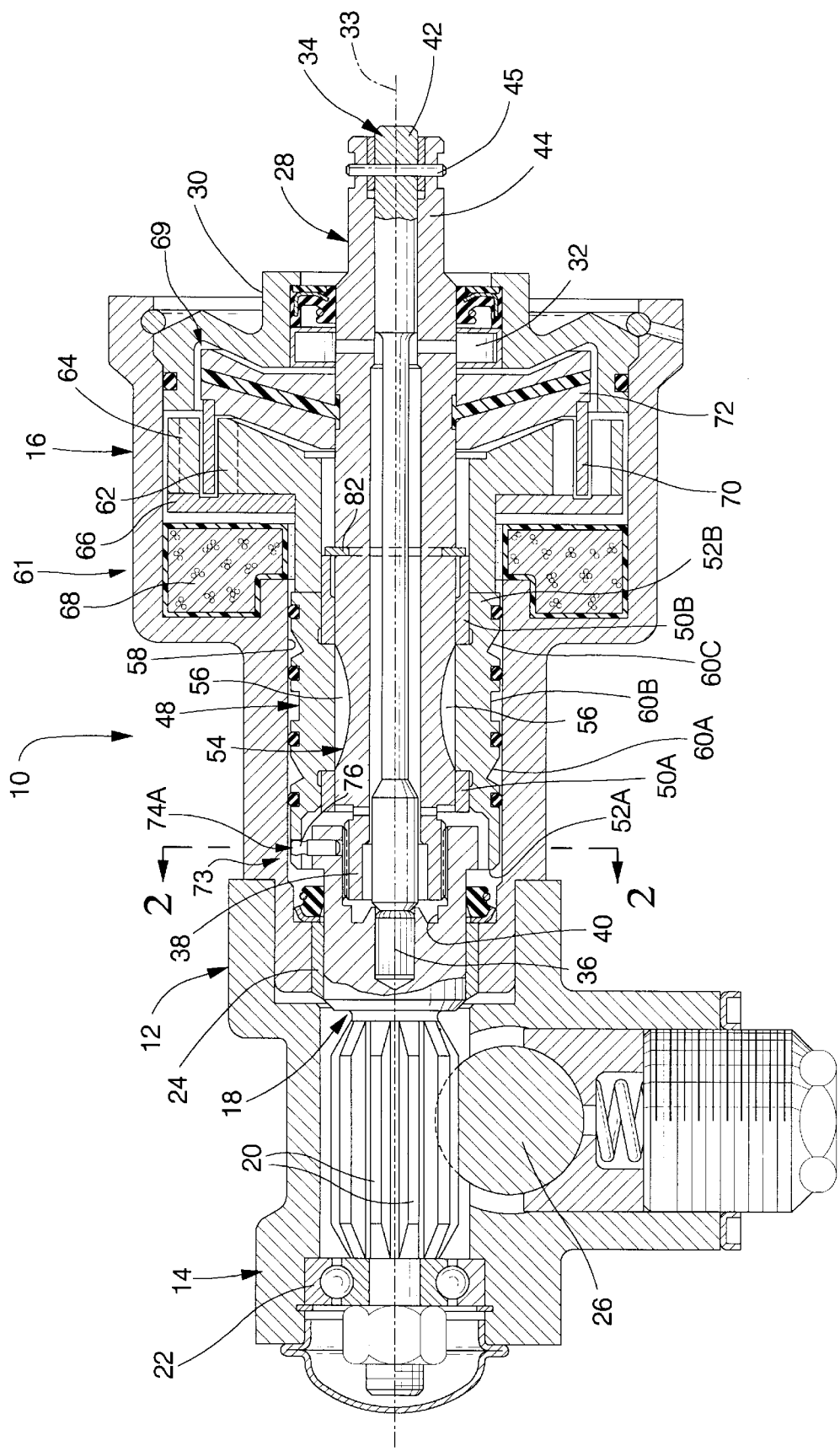
FIG. 1 is a longitudinal sectional view of a motor vehicle power steering gear according to this invention.

A motor vehicle power steering gear 10 according to this invention includes a housing 12 consisting of a rack housing 14 and a valve housing 16. A pinion head 18 having a pinion gear 20 thereon is rotatably supported on the rack housing 14 by a roller bearing 22 and by a sleeve bearing 24. A rack bar 26 having a plurality of rack teeth meshing with the pinion gear 20 is supported on the rack housing 14 for back and forth linear translation perpendicular to the pinion head concurrent with rotation of the latter. Opposite ends of the rack bar, not shown, are linked to dirigible wheels of the motor vehicle in conventional fashion for steering the wheels by linear translation of the rack bar.

A tubular spool shaft 28 of the steering gear protrudes into the valve housing 16 through a cover 30 on the valve housing and is supported on the cover by a bearing 32 for rotation about a nominal axis of rotation or centerline 33 of the steering gear. A proportional control valve in the valve housing 16, similar to the valve described in the aforesaid U.S. Pat. No. 4,454,801, includes a torsion bar 34 inside the tubular spool shaft. An inboard end 36 of the torsion bar protrudes beyond a corresponding inboard end 38 of the spool shaft 28 and is interference fitted in a serrated bore at the bottom of a counterbore 40 in the pinion head 18. An outboard end 42 of the torsion bar is connected to the spool shaft 28 at an outboard end 44 of the latter by a pin 45.

Figure 2:
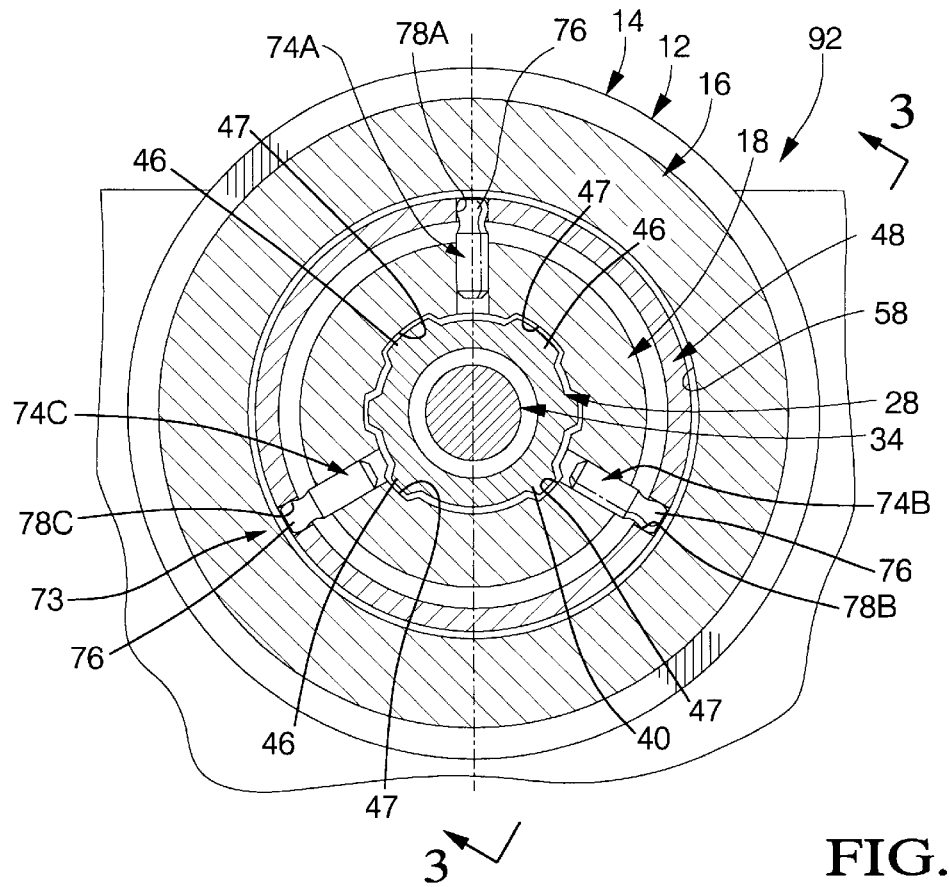
FIG. 2 is a sectional view taken generally along the plane indicated by lines 2—2 in FIG. 1.

The outboard end 44 of the spool shaft is connected to a manual steering wheel, not shown, of the motor vehicle for rotation as a unit with the steering wheel. A plurality of bosses 46 on the spool shaft 28 at the inboard end 38 thereof, FIG. 2, nest with clearance in a corresponding plurality of grooves 47 in the pinion head 18 in the side of the counterbore 40 and cooperate with the grooves in defining a lost motion connection which permits limited relative rotation between the spool shaft and the pinion head about the centerline 33 of the steering gear.

The proportional control valve further includes a tubular valve body 48 rotatably supported on the spool shaft by a pair of rings 50A, 50B interference fitted in counterbores in respective ones of a pair of opposite ends 52A, 52B of the valve body and closely received around the spool shaft. A valve spool 54 of the proportional control valve is defined on the part of the spool shaft 28 shrouded by the valve body 48 between the ends 52A, 52B of the latter and includes a plurality of arc-shaped slots 56 in the spool shaft facing a plurality of internal grooves, not shown, in the valve body and cooperating therewith in defining a plurality of throttling orifices, not shown, which open and close in response to relative rotation between the valve body and the spool shaft.

The valve body 48 is surrounded by a cylindrical wall 58 of the valve housing 16 with clearance between the wall and the valve body illustrated in exaggerated fashion in the drawings. A plurality of outside annular grooves 60A, 60B, 60C on the valve body 48 are isolated from each other by seal rings on the valve body slidably engaging the cylindrical wall 58. The grooves 60A, 60C are connected to opposite working chambers, not shown, of a steering assist fluid motor. The groove 60B is connected to a pump, not shown. When the valve spool rotates relative to the valve body, the ones of the throttling orifices which are closing regulate a boost pressure in the corresponding one of the annular grooves 60A, 60C and in one chamber of the steering assist fluid motor. The ones of the throttling orifices which are opening facilitate unrestricted drainage of low pressure fluid from the other of the working chambers of the fluid motor.

An electromagnetic mechanism 61 of the steering gear 10 operative to vary the effective restoring force of the torsion bar 34 includes an inner pole piece 62 and an outer pole piece 64 rigidly connected to the inner pole piece by a ring 66. The inner pole piece is rigidly connected to the ring 50B on the valve body by an interference fit whereby the pole pieces 62, 64 are rotatable as a unit with the valve body 48. An encapsulated annular exciting coil 68 is rigidly mounted on the valve housing 16 adjacent the pole pieces 62, 64.

The electromagnetic apparatus further includes a permanent magnet assembly 69 consisting of a cylindrical magnet ring 70 between the inner and outer pole pieces 62, 64 and a retaining hub 72 rigidly attached to the magnet ring and to the spool shaft 28 so that the magnet ring is rotatable as a unit with the spool shaft. The magnet ring is made of sintered powdered metal which is exposed to a strong, externally created magnet field such that a plurality of radially oriented permanent magnets, not shown, are formed on the magnet ring. When the exciting coil is turned on, an electromagnetic torque reaction is induced between the valve body 48 and the spool shaft 28, the direction and magnitude of which depends on the direction and magnitude of the flow of direct current in the exciting coil.

Figure 3:
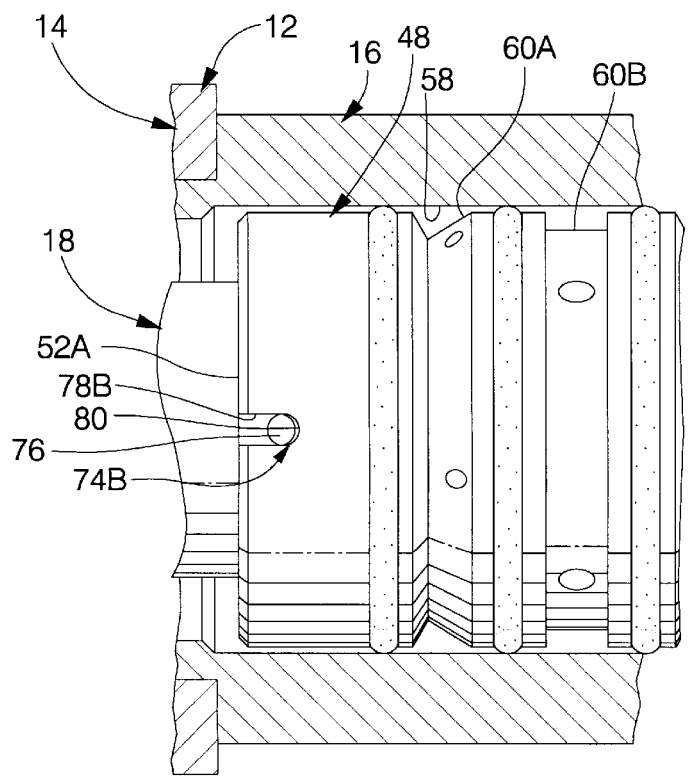
FIG. 3 is a fragmentary sectional view taken generally along the plane indicated by lines 3—3 in FIG. 2.

A tripod joint 73 between the pinion head 18 and the valve body 48 includes a plurality of three radial pins 74A, 74B, 74C rigidly attached to the pinion head 18 at equal angular intervals of 120° around and in a plane perpendicular to the longitudinal centerline 33 of the steering gear. Each of the pins 74A, 74B, 74C has a spherical lobe 76 which is closely received in a corresponding one of a plurality of three longitudinal slots 78A, 78B, 78C in the end 52A of the valve body 48 near an inboard end 80 of each slot, FIG. 3. In the direction of the longitudinal centerline 33 of the steering gear, the valve body is captured between the spherical lobes 76 on the radial pins 74A, 74B, 74C and a retaining ring 82 seated in a groove in the spool shaft 28 adjacent to an end of the ring 50B.

The tripod joint 73 couples the valve body and the pinion head for unitary rotation about the nominal centerline 33 of the steering gear and prevents lateral displacement of the valve body relative to the pinion head, i.e., relative displacement perpendicular to the centerline 33. The inboard end 38 of the spool shaft 28 in the counterbore 40 in the pinion head 18 is uncoupled from the pinion head with respect to displacement perpendicular to the centerline 33 except through the valve body 48 and the tripod joint 73 between the valve body and the pinion head.

The torsion bar 34 defines an open-center position of the valve spool 54 relative to the valve body 48 in which all of the aforesaid throttling orifices are equally open and fluid circulates freely from the groove 60B to a drain, not shown, connected to a reservoir. When a driver turns the aforesaid manual steering wheel, the spool shaft 28 rotates relative to the pinion head 18 against a restoring force induced by the twist of the torsion bar 34 because the dirigible wheels initially prevent rotation of the pinion head. The valve body 48 is held stationary by the pinion head 18 through the tripod joint 73 so that the valve spool 54 rotates relative to the valve body to close some of the aforesaid throttling orifices for regulating a steering assist boost pressure in the usual fashion.

At the same time, electromagnetic torque between the magnet ring 70 and the pole pieces 62, 64 induced by electric current in the exciting coil 68 is reacted to the spool shaft 28 through the retaining hub 72 and to the pinion head 18 through the ring 50B, the valve body 48, and the tripod joint 73. Depending upon the direction of current flow in the exciting coil, the induced electromagnetic torque increases or decreases the effective restoring force of the torsion bar to vary the proportionality of the control valve.

Importantly, because the inboard end 38 of the spool shaft 28 is unsupported laterally on the pinion head 18 except through the tripod joint 73, the inboard end 38 floats laterally with the valve body 48 in the event of lateral runout between the pinion head and the spool shaft during relative rotation therebetween. Accordingly, the tripod joint 73 minimizes potential valve hysteresis attributable to binding between the valve body 48 and the valve spool 54 due to such lateral runout between the spool shaft and the pinion head.

Figure 4:
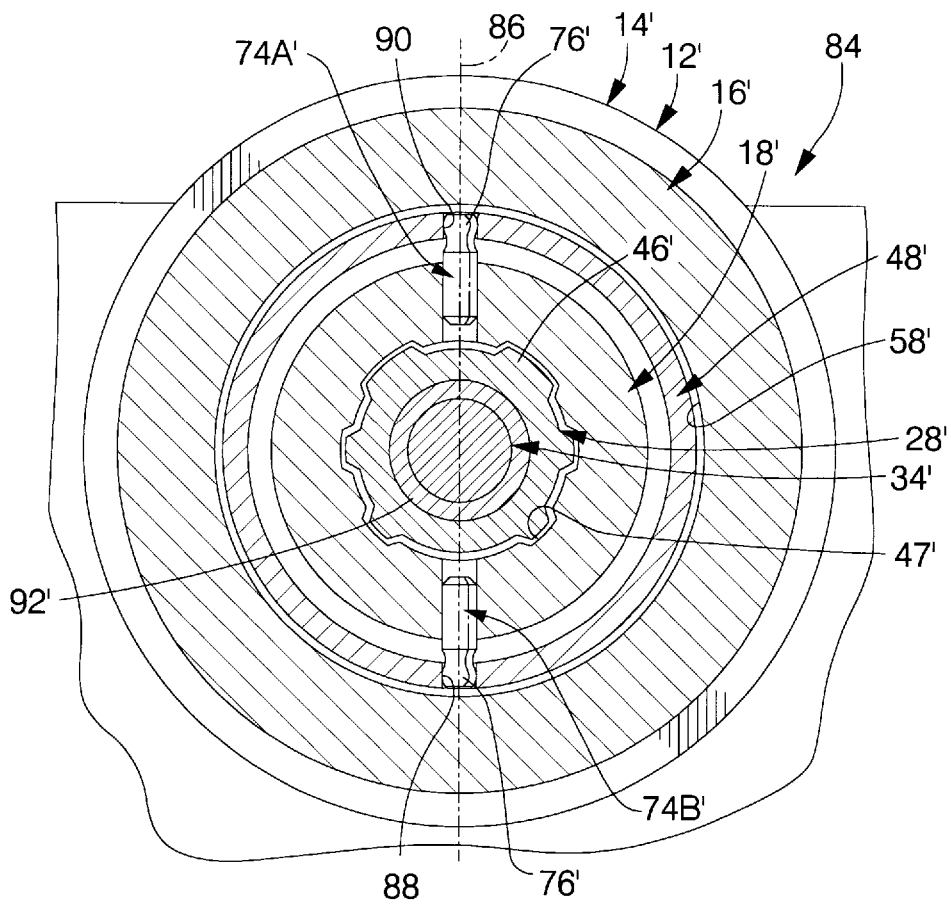
FIG. 4 is similar to FIG. 2 but showing for comparison a portion of a prior art motor vehicle power steering gear. U.S. Pat. No. 5,119,898.

The steering gear 10 according to this invention is contrasted with a prior steering gear 84 developed for the assignee of this invention. Referring to FIG. 4 which illustrates such prior art, wherein elements functionally common to both of the steering gears 10 and 84 are identified by primed reference characters, the prior steering gear 84 includes a pair of diametrically opposite radial pins 74A', 74B' rigidly attached to a pinion head 18'. Each of the radial pins 74A', 74B' is aligned on a lateral centerline 86 of the pinion head and includes a spherical lobe 76'. The lobe 76' of the pin 74B' fits closely in a radial bore 88 in a tubular valve body 48'. The spherical lobe 76' of the pin 74A' fits closely between the sides of an open slot 90 in the valve body 48' diametrically opposite the radial bore 88.

A bushing 92 on a spool shaft 28' at an inboard end thereof, not shown, defines a close fitting sleeve bearing between the inboard end of the spool shaft and a torsion bar 34' inside of the spool shaft. The torsion bar 34' is rigidly connected at its opposite ends to the spool shaft and to a pinion head, not shown. The bushing 92 prevents lateral displacement of the inboard end of the spool shaft 28' relative to the pinion head in any direction. The valve body 48' is unrestrained in the direction of the lateral centerline 86 because of clearance outboard of the pins 74A', 74B'. Therefore, during relative rotation between the valve body and the pinion head, the valve body 48' is free to float parallel to the lateral centerline 86 relative to the pinion head to prevent binding of the valve body against the spool shaft.

The spherical lobes 76' on the radial pins 74A', 74B' fit closely in the radial bore 88 and in the slot 90 to minimize lash between the valve body 48' and the pinion head. Such close fit effectively prevents the valve body 48' from floating perpendicular to the lateral centerline 86 so that lateral runout between the pinion head and the spool shaft may induce binding between the valve body and the valve spool during relative rotation therebetween. In the steering gear 10 according to this invention, however, the inboard end 38 of the spool shaft 28 floats laterally with the valve body 48 in all directions perpendicular to the centerline 33 by virtue of the absence of a bushing corresponding to the bushing 92 thereby to avoid the lateral thrust otherwise attributable to such bushing.

I claim:

1. A motor vehicle power steering gear comprising:

a housing, a pinion head supported on said housing for rotation about a centerline of said steering gear, a tubular spool shaft supported at an outboard end thereof on said housing for rotation about said centerline of said steering gear independently of said pinion head having an inboard end adjacent said pinion head, a torsion bar in said tubular spool shaft having an outboard end rigidly connected to said outboard end of said spool shaft and an inboard end protruding beyond said inboard end of spool shaft and rigidly connected to said pinion head so that said torsion bar establishes a center position of said spool shaft relative to said pinion head and induces a restoring force on said spool shaft in response to rotation thereof relative to said pinion head, the inboard end of said spool shaft being movable in all directions within a plane perpendicular to said centerline relative to both said pinion head and said torsion bar, a valve spool rotatable as a unit with said spool shaft, a tubular valve body rotatably journaled on said spool shaft around said valve spool, and a tripod joint between said valve body and said pinion head including a plurality of three slots in a first end of said valve body equally angularly spaced around said centerline of said steering gear, and a plurality of three radial pins rigidly attached to said pinion head at equal angular intervals around said centerline of said steering gear each having a spherical lobe closely received in a corresponding one of said plurality of slots in said first end of said valve body, whereby said valve body is coupled to said pinion head for unitary rotation therewith and said inboard end of said spool shaft is unsupported on said pinion head a plane perpendicular to said centerline of said steering gear except through said valve body and said tripod joint.

2. The motor vehicle power steering gear recited in claim 1 further comprising:

an inboard end in each of said plurality of three slots in said first end of said valve body adjacent said spherical lobe on the corresponding one of said radial pins on said pinion head, and a retaining ring on said spool shaft on the opposite side of said valve body from said pinion head cooperating with said inboard ends of said plurality of three slots in said first end of said valve body in capturing said valve body in the direction of said centerline of said steering gear.

3. The motor vehicle power steering gear recited in claim 1 further comprising:

an electromagnetic apparatus operative to vary the effective restoring force of said torsion bar including a pole piece rigidly connected to said valve body at a second end of said valve body opposite from said first end of said valve body, a magnet ring rigidly connected to said spool shaft, and an exciting coil on said steering gear housing operative to induce an electromagnetic torque between said pole piece and said magnet ring when an electric current flows through said exciting coil which electromagnetic torque is reacted to said pinion head through said valve body and to said spool shaft.

* * * * *